United States Patent [19]
Hiraoka et al.

[11] Patent Number: 6,075,676
[45] Date of Patent: Jun. 13, 2000

[54] HEAD ASSEMBLY INCLUDING SHORTED HEAD LEADS FOR PREVENTING DAMAGE OF HEAD DURING MANUFACTURE OF A MAGNETIC STORAGE SYSTEM

[75] Inventors: Shinji Hiraoka, Kawasaki; Masashi Shiraishi, Kitasaku-gun; Takuro Tsuruda, Nakakoma-gun; Noboru Yamanaka, Saku, all of Japan

[73] Assignees: Fujitsu Limited, Kawasaki; TDK Corp., Tokyo, both of Japan

[21] Appl. No.: 09/153,275

[22] Filed: Sep. 14, 1998

[30] Foreign Application Priority Data

Apr. 28, 1998 [JP] Japan .................. 10-118038

[51] Int. Cl.⁷ .................. G11B 5/40; G11B 5/58
[52] U.S. Cl. .................. 360/104; 360/113
[58] Field of Search .................. 360/97.01, 97.02, 360/104, 113, 128

[56] References Cited

U.S. PATENT DOCUMENTS

| | | | |
|---|---|---|---|
| 5,465,186 | 11/1995 | Bajorek et al. | 360/113 |
| 5,539,598 | 7/1996 | Denison et al. | 360/113 |
| 5,638,237 | 6/1997 | Phipps et al. | 360/128 |
| 5,644,454 | 7/1997 | Arya et al. | 360/106 |
| 5,699,212 | 12/1997 | Erpelding et al. | 360/104 |
| 5,896,247 | 4/1999 | Pan et al. | 360/104 |
| 5,991,121 | 11/1999 | Kanda | 360/104 |

FOREIGN PATENT DOCUMENTS

| | | |
|---|---|---|
| 63-93139 | 4/1988 | Japan . |
| 4-114307 | 4/1992 | Japan . |
| 7141636 | 6/1995 | Japan . |
| 9223304 | 8/1997 | Japan . |

*Primary Examiner*—Jefferson Evans
*Attorney, Agent, or Firm*—Greer, Burns & Crain, Ltd.

[57] ABSTRACT

A head assembly including a suspension, a head slider mounted on a front end portion of the suspension and having a magnetoresistive element, and a pair of lead lines formed on the suspension and having first ends connected to the magnetoresistive element. The head assembly further includes a metal ball connected by bonding to the pair of lead lines. In handling the head assembly as a separate member, a current caused by static electricity flows through the metal ball short-circuiting the pair of lead lines, thereby preventing burning of the magnetoresistive element due to the current. After mounting the head assembly to an actuator arm, the metal ball is removed to electrically open the pair of lead lines.

14 Claims, 12 Drawing Sheets

HEAD ASSEMBLY INCLUDING SHORTED HEAD LEADS FOR PREVENTING DAMAGE OF HEAD DURING MANUFACTURE OF A MAGNETIC STORAGE SYSTEM

BACKGROUND OF THE INVENTION

1. Field of the Invention

The present invention relates to a head assembly for use with a magnetic disk drive for a computer.

2. Description of the Related Art

In response to recent downsizing and density increasing of a magnetic disk drive, the flying height of a head slider has been reduced and it has been desired to realize contact recording/reproduction such that the slider flies at a microscopic height from a recording medium or comes to contact with the recording medium. In a conventional magnetic induction head, a decrease in peripheral speed (relative speed between the head and the recording medium) due to a decrease in diameter of a magnetic disk causes a deterioration in reproductive output. It has therefore been desired to develop a magnetoresistive head (MR head) or a giant magnetoresistive head (GMR head) which can obtain a large reproductive output even at a low peripheral speed with no peripheral speed dependence of reproductive output. It should be noted that the term of magnetoresistive head (MR head) used in this specification includes giant magnetoresistive head (GMR head).

In the MR head, a constant sense current is supplied to a magnetoresistive element (MR element) to convert changes in magnitude of a signal field leaking from a recording track of the recording medium into changes in resistance, thereby reproducing the information recorded on the medium as changes in voltage. The MR element of the MR head is formed generally by a thin-film process or the like. The MR head further has a coil for writing data to the recording medium. The head slider is mounted by adhesion or the like on a front end portion of a suspension formed of stainless steel.

Lead lines for connecting the MR element and the coil to a recording and reproducing circuit in a magnetic disk drive are formed by copper patterns printed on the suspension. By mounting the suspension on a front end portion of an actuator arm, the MR element and the coil are connected through a flexible printed circuit board (FPC) or the like to the recording and reproducing circuit.

In the suspension for supporting a conventional MR head slider, a pair of lead lines connected to the terminals of the MR element are electrically open, or the lead lines and a ground line connected to a magnetic shield for the MR element are electrically open. Accordingly, when a worker charged with static electricity handles such a suspension having the MR head slider or carries the suspension contained in a static-prone plastic case or the like, an excess current due to the static electricity flows into the MR element to burn the MR element, or the static electricity is discharged between the MR element and the magnetic shield to cause burning of the MR element.

SUMMARY OF THE INVENTION

It is therefore an object of the present invention to provide a head assembly which can prevent burning of the MR element due to static electricity.

In accordance with an aspect of the present invention, there is provided a head assembly comprising a suspension; a head slider mounted on a front end portion of said suspension and having a magnetoresistive element; a pair of lead lines formed on said suspension and having first ends connected to said magnetoresistive element; and a metal ball connected by bonding to said pair of lead lines.

Preferably, the metal ball comprises a gold ball, and each of the lead lines is coated with gold. The gold ball is bonded to the lead lines by diffusion jointing of gold as applying high-frequency vibrations to a capillary of a bonding machine.

The suspension has a tab suspended from one side edge, and the pair of lead lines extend to the tab and are connected to terminals formed on the tab. In this configuration, the lead lines on the tab may be connected by bonding through the metal ball.

In accordance with another aspect of the present invention, there is provided a head assembly comprising a suspension; a head slider mounted on a front end portion of said suspension and having a magnetoresistive element and a magnetic shield for said magnetoresistive element; a pair of lead lines formed on said suspension and having first ends connected to said magnetoresistive element; a ground line formed on said suspension and having one end connected to said magnetic shield; a first metal ball connected by bonding to said pair of lead lines; and a second metal ball connected by bonding to one of said lead lines and to said ground line.

In accordance with a further aspect of the present invention, there is provided a suspension for supporting a head slider having a magnetoresistive element, comprising; a pair of lead lines formed on said suspension and having first ends to be connected to said magnetoresistive element; and a metal ball connected by bonding to said pair of lead lines.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
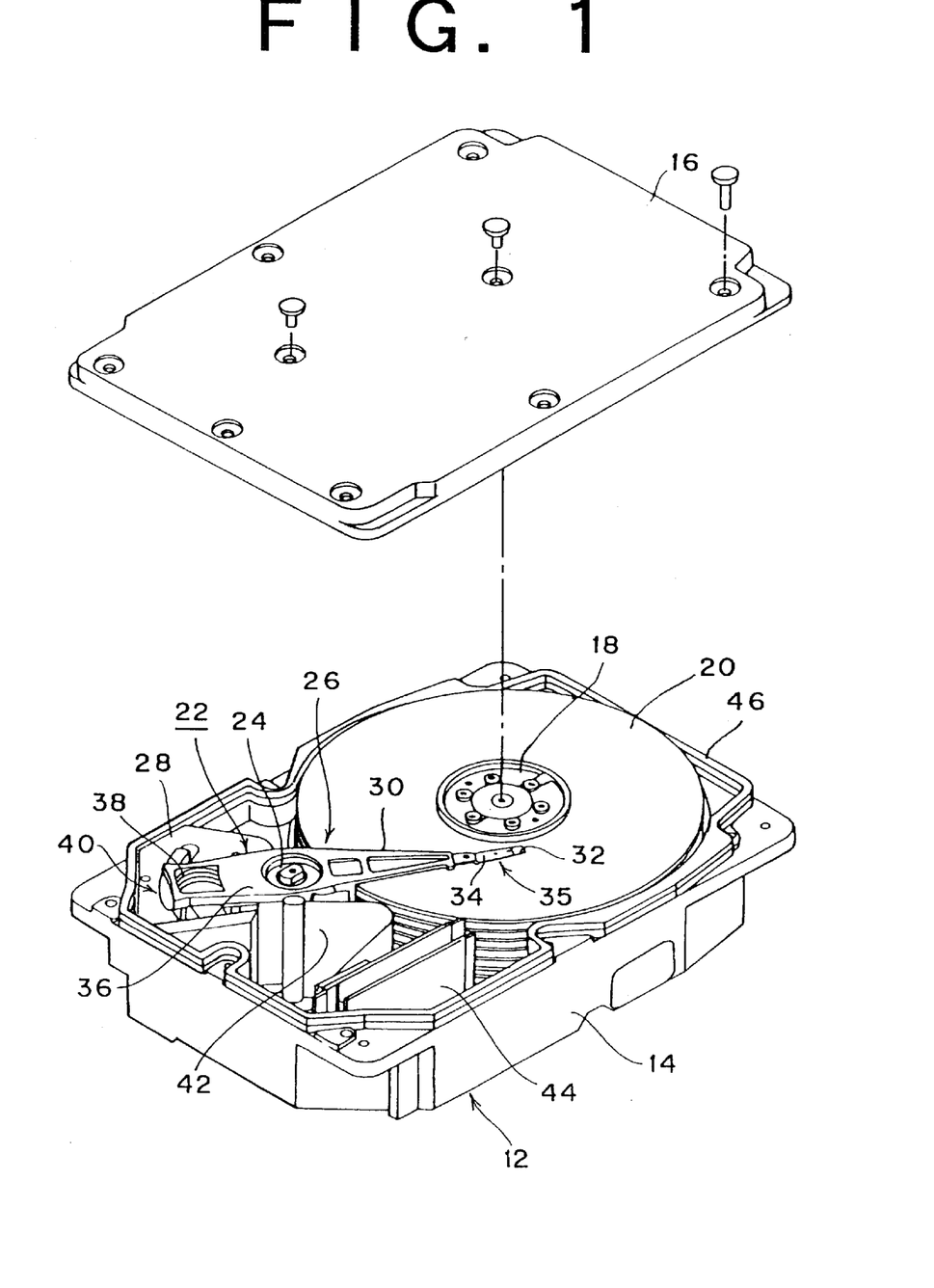
FIG. 1 is a perspective view of a magnetic disk drive including a head assembly according to the present invention.

Referring to FIG. 1, there is shown a perspective view of a magnetic disk drive in which a head assembly according to the present invention is mounted. Reference numeral 12 denotes a housing (disk enclosure) consisting of a base 14 and a cover 16. A spindle hub (not shown) rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Figure 2:
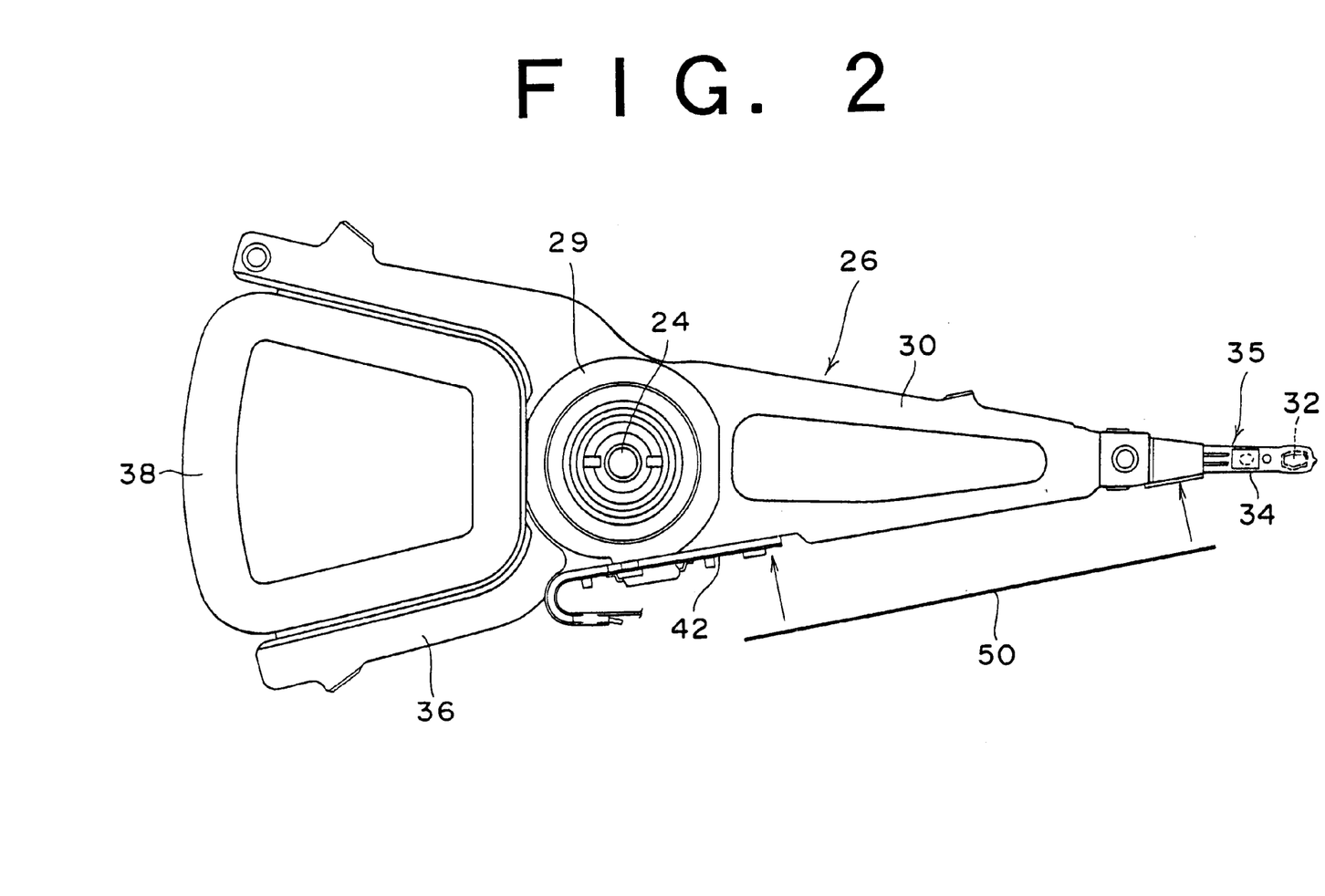
FIG. 2 is a plan view of an actuator assembly shown in FIG. 1.
Figure 3:
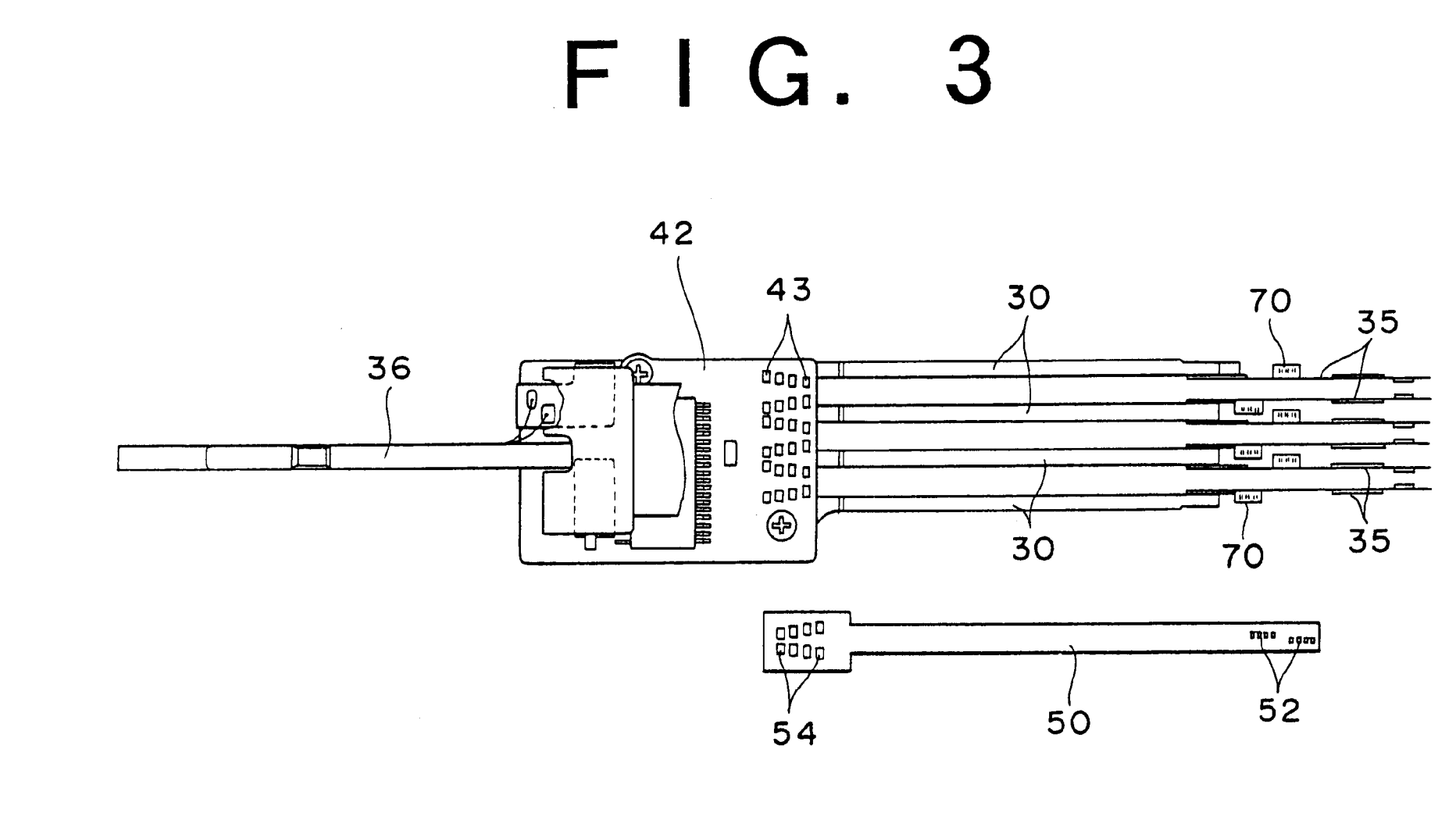
FIG. 3 is a side view of the actuator assembly shown in FIG. 2.

Reference numeral 22 denotes a rotary actuator consisting of an actuator assembly 26 and a magnetic circuit 28. The actuator assembly 26 is mounted so as to be rotatable about a shaft 24 fixed to the base 14. As best shown in FIGS. 2 and 3, the actuator assembly 26 includes an actuator block 29 rotatably mounted on the shaft 24, a plurality of actuator arms 30 integral with the actuator block 29 and extending radially therefrom in one direction, and a coil supporting member 36 integral with the actuator block 29 and extending radially therefrom in a direction opposite to the direction of extension of the actuator arms 30.

A suspension 34 is fixed at its base end portion to a front end portion of each actuator arm 30. A head slider 32 is mounted on a front end portion of the suspension 34. The head slider 32 and the suspension 34 constitute a head assembly 35. A coil 38 is supported by the coil supporting member 36. The magnetic circuit 28 and the coil 38 inserted in a gap of the magnetic circuit 28 constitute a voice coil motor (VCM) 40.

Reference numeral 42 denotes a main flexible printed circuit board (main FPC) for taking a signal from a magnetoresistive element (MR element) mounted on the head slider 32. As shown in FIG. 2, the main FPC 42 is fixed at its one end to the side surface of the actuator block 29. As shown in FIG. 1, an intermediate portion of the main FPC 42 is fixed by a fixing member 44, and the other end of the main FPC 42 is electrically connected to a connector (not shown). As best shown in FIG. 3, an interconnection FPC 50 is attached by adhesion to one side surface of each actuator arm 30. Terminals 52 formed on one end portion of the interconnection FPC 50 are connected by bonding to terminals formed on a tab 70 of each head assembly 35. Further, terminals 54 formed on the other end portion of the interconnection FPC 50 are connected by bonding to terminals 43 formed on the main FPC 42.

Referring again to FIG. 1, an annular packing assembly 46 is mounted on the base 14. The housing 12 is sealed by securing the cover 16 through the packing assembly 46 to the base 14 by screws.

Figure 4:
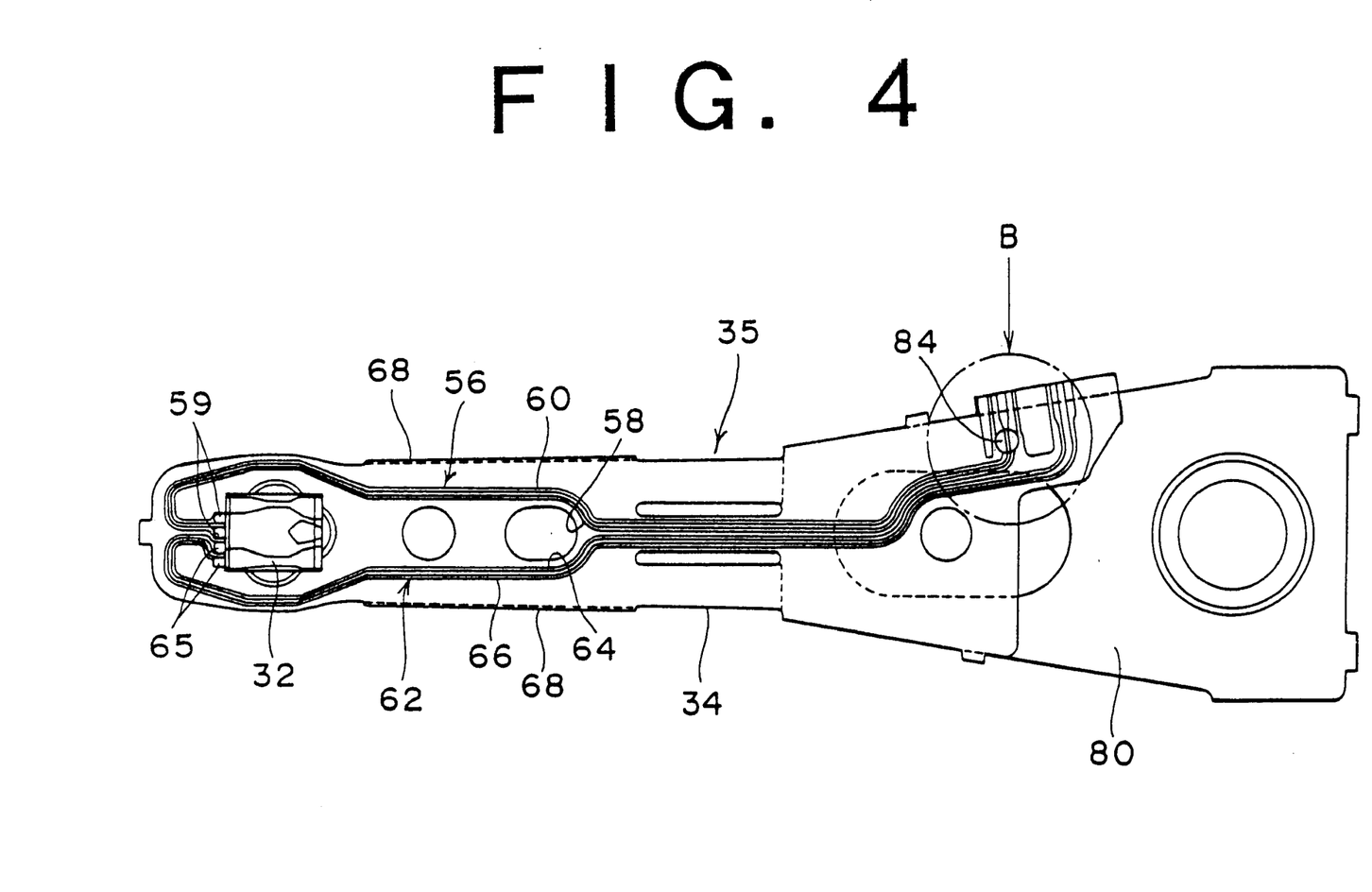
FIG. 4 is a plan view of a head assembly according to a first preferred embodiment of the present invention.
Figure 5:
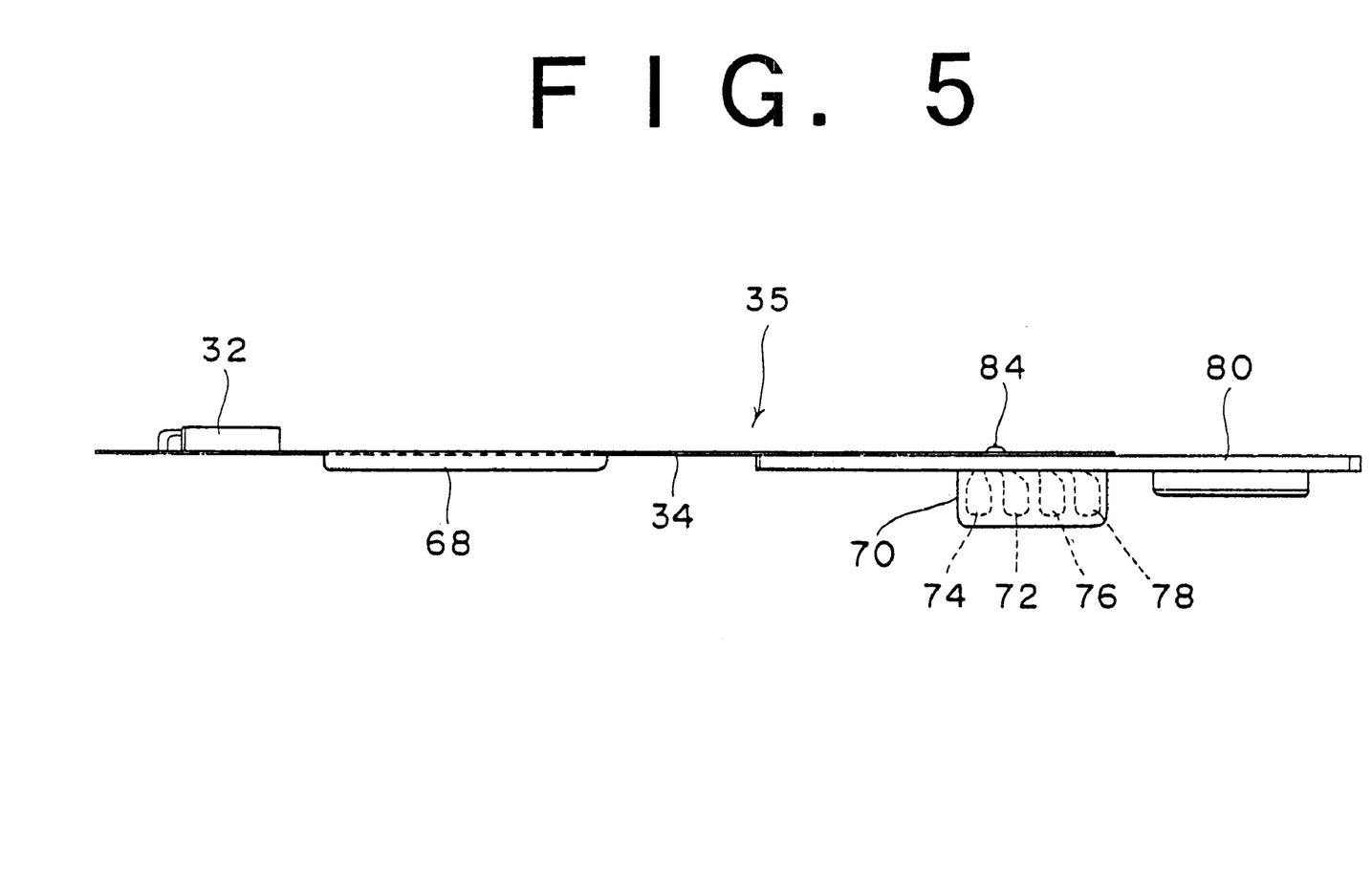
FIG. 5 is a side view of the head assembly shown in FIG. 4.

FIG. 4 is a plan view of a head assembly 35 according to a first preferred embodiment of the present invention, and FIG. 5 is a side view of the head assembly 35. The head assembly 35 is composed primarily of a suspension 34 formed of stainless steel, for example, and a head slider 32 mounted on a front end portion of the suspension 34. The head slider 32 has a magnetoresistive head (MR head) 32a shown in detail in FIG. 6. A spacer 80 to be crimped to the actuator arm 30 is fixed by welding or the like to a base end portion of the suspension 34. An MR wiring pattern 56 consisting of a pair of lead lines 58 and 60 and a coil wiring pattern 62 consisting of a pair of lead lines 64 and 66 are formed by printing on the suspension 34. Each of the lead lines 58, 60, 64, and 66 is formed mainly of copper, which is coated with gold through nickel by vapor deposition.

First ends of the lead lines 58 and 60 are respectively connected by bonding through gold balls 59 to terminals of an MR element of the MR head 32a to be hereinafter described. Similarly, first ends of the lead lines 64 and 66 are respectively connected by bonding through gold balls 65 to terminals of a coil of the MR head 32a to be hereinafter described. As shown in FIGS. 4 and 5, the suspension 34 is integrally formed at its opposite side edges with a pair of ribs 68 for ensuring the rigidity of the suspension 34. Further, a tab 70 is suspended from one side edge of the suspension 34 at its base end portion. Four terminals 72, 74, 76, and 78 are formed on the tab 70, and are connected to second ends of the lead lines 58, 60, 64, and 66, respectively.

Figure 6:
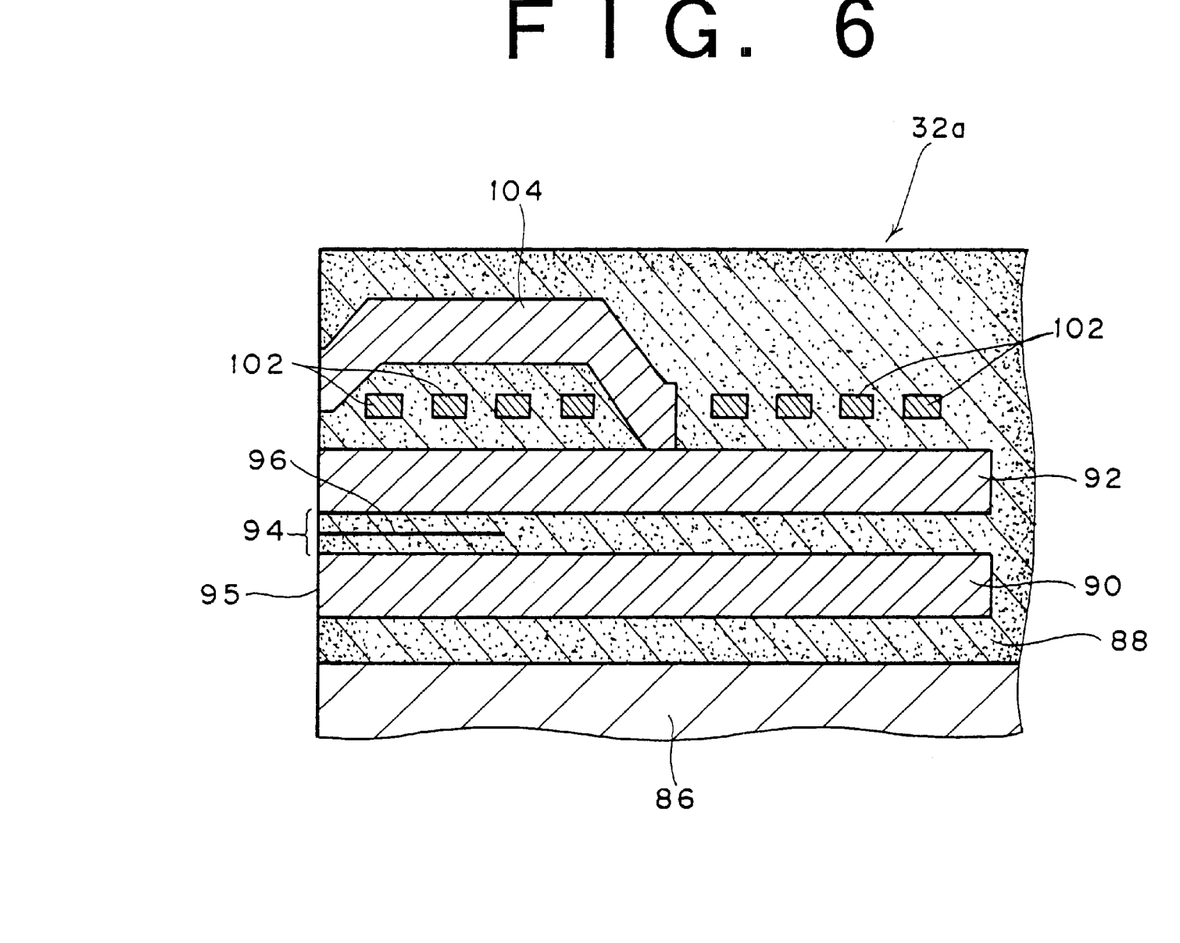
FIG. 6 is a sectional view of an MR head used in the first preferred embodiment.

Referring to FIG. 6, there is shown a fragmentary sectional view of the MR head 32a. The MR head 32a has a conductive substrate 86 and a nonmagnetic insulating layer 88 formed on the conductive substrate 86. The nonmagnetic insulating layer 88 is formed of alumina ($Al_2O_3$), for example. First and second magnetic shields 90 and 92 of nickel-iron (Ni-Fe), for example, are embedded in the nonmagnetic insulating layer 88. A gap 94 for improving a reproductive resolution is defined between the first and second magnetic shields 90 and 92 on a front end surface (medium opposing surface) 95 of the head 32a.

A magnetoresistive element (MR element) 96 of nickel-iron (Ni-Fe), for example, is embedded in the nonmagnetic insulating layer 88 in such a manner that one end of the MR element 96 is exposed to the front end surface 95 of the head 32a. Although not especially shown, a sense current source is connected to a pair of terminals of the MR element 96, and a constant sense current is supplied from the sense current source to the MR element 96.

Reference numeral 104 denotes a magnetic pole having one end exposed to the front end surface 95 of the head 32a and the other end connected to the second magnetic shield 92. A conductor coil 102 is wound substantially around a connected portion between the magnetic pole 104 and the second magnetic shield 92. By passing a current modulated by information to be recorded through the coil 102, a magnetic field corresponding to the amperage of the current is induced to thereby magnetically record the information on a recording track of the magnetic disk 20.

In reading information recorded on the magnetic disk 20, the MR element 96 is used. That is, a signal flux from a recording track of the magnetic disk 20 is received into the head 32a to enter the MR element 96, thereby magnetizing the MR element 96. The magnetic flux passed through the MR element 96 is absorbed by the first and second magnetic shields 90 and 92. The resistance of the MR element 96 changes with changes in magnitude of the signal flux. Since a constant sense current is being supplied from the sense current source to the MR element 96, a voltage between the pair of terminals of the MR element 96 changes with changes in the resistance of the MR element 96. Thus, the information recorded on the magnetic disk 20 can be reproduced as a voltage signal.

Figure 7:
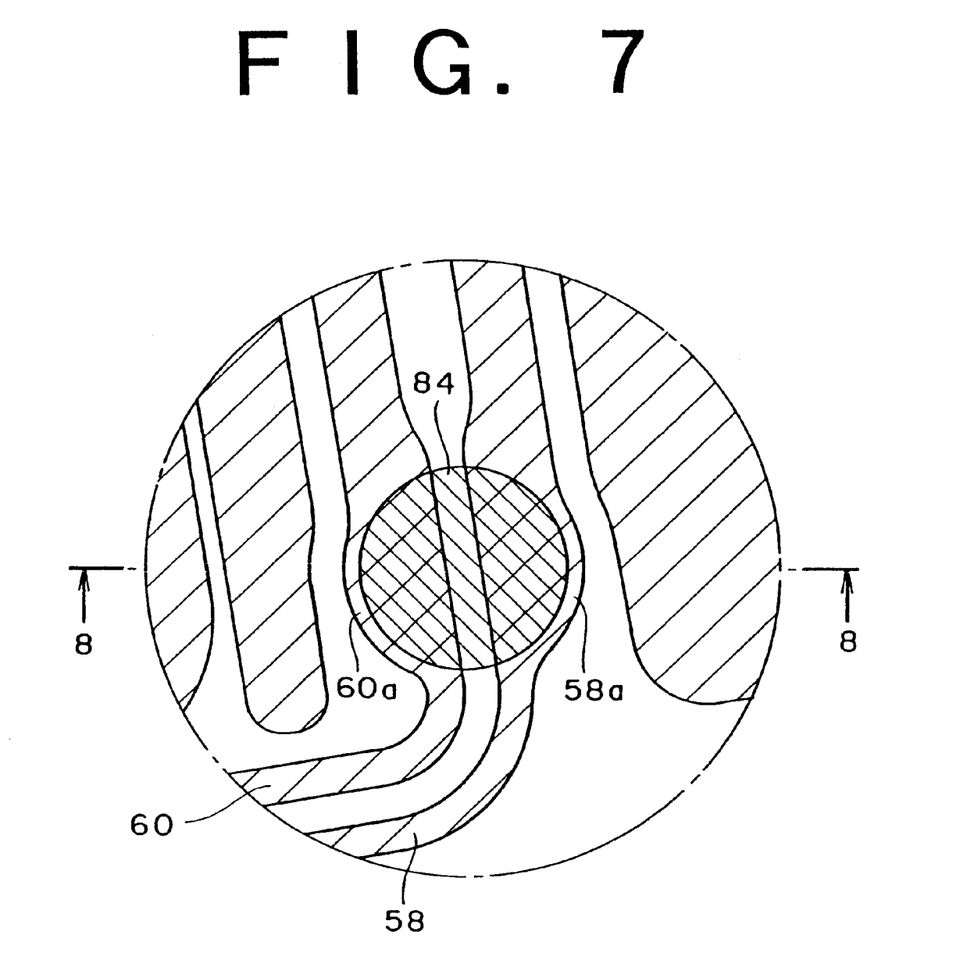
FIG. 7 is an enlarged view of an encircled portion B in FIG. 4.
Figure 8:
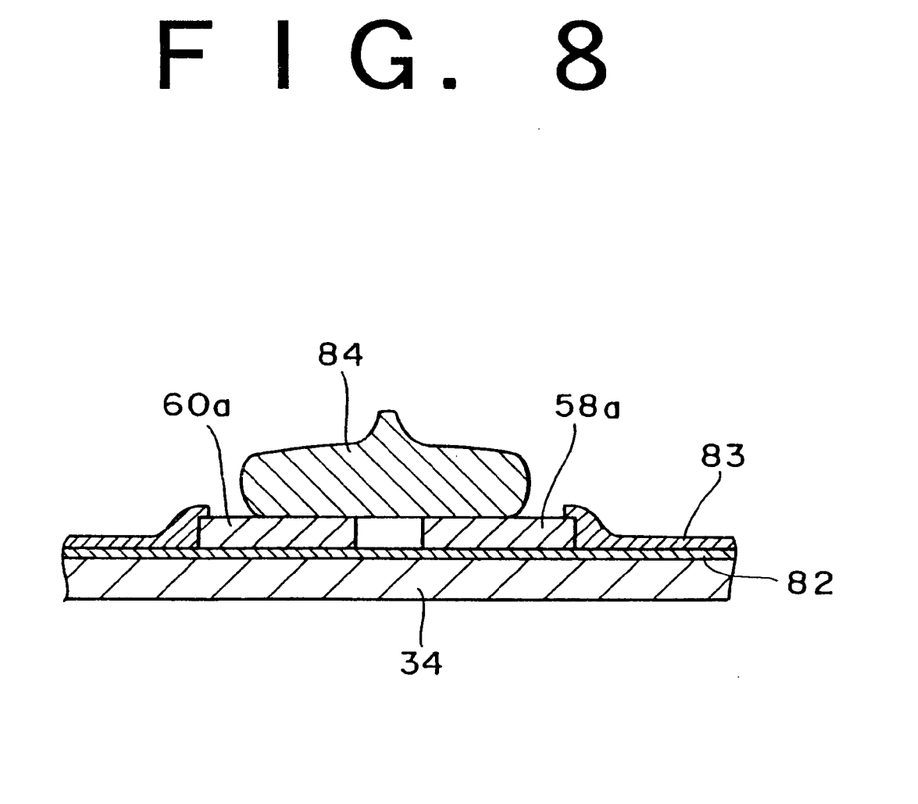
FIG. 8 is a cross section taken along the line 8—8 in FIG. 7.

Referring to FIG. 7 which is an enlarged view of an encircled portion B in FIG. 4, the pair of lead lines 58 and 60 of the MR wiring pattern 56 have wide portions 58a and 60a, respectively. As shown in FIG. 8, an insulating film 82 is formed on the suspension 34 of stainless steel, and the lead lines 58 and 60 are formed on the insulating film 82. Other insulating films 83 are formed on the insulating film 82.

As described above, each of the lead lines 58 and 60 is formed mainly of copper as a base layer. The copper base layer is coated with a nickel layer by vapor deposition. The nickel layer is further coated with a gold layer by vapor deposition. Such a multilayer structure is applied also to the lead lines 64 and 66 of the coil wiring pattern 62. Accordingly, each of the lead lines 58, 60, 64, and 66 has a gold coating on the surface. The lead lines 58 and 60 of the MR wiring pattern 56 are connected together at the wide portions 58a and 60a by bonding through a gold ball 84. The bonding is accomplished by using a well-known bonding machine.

Figure 9:
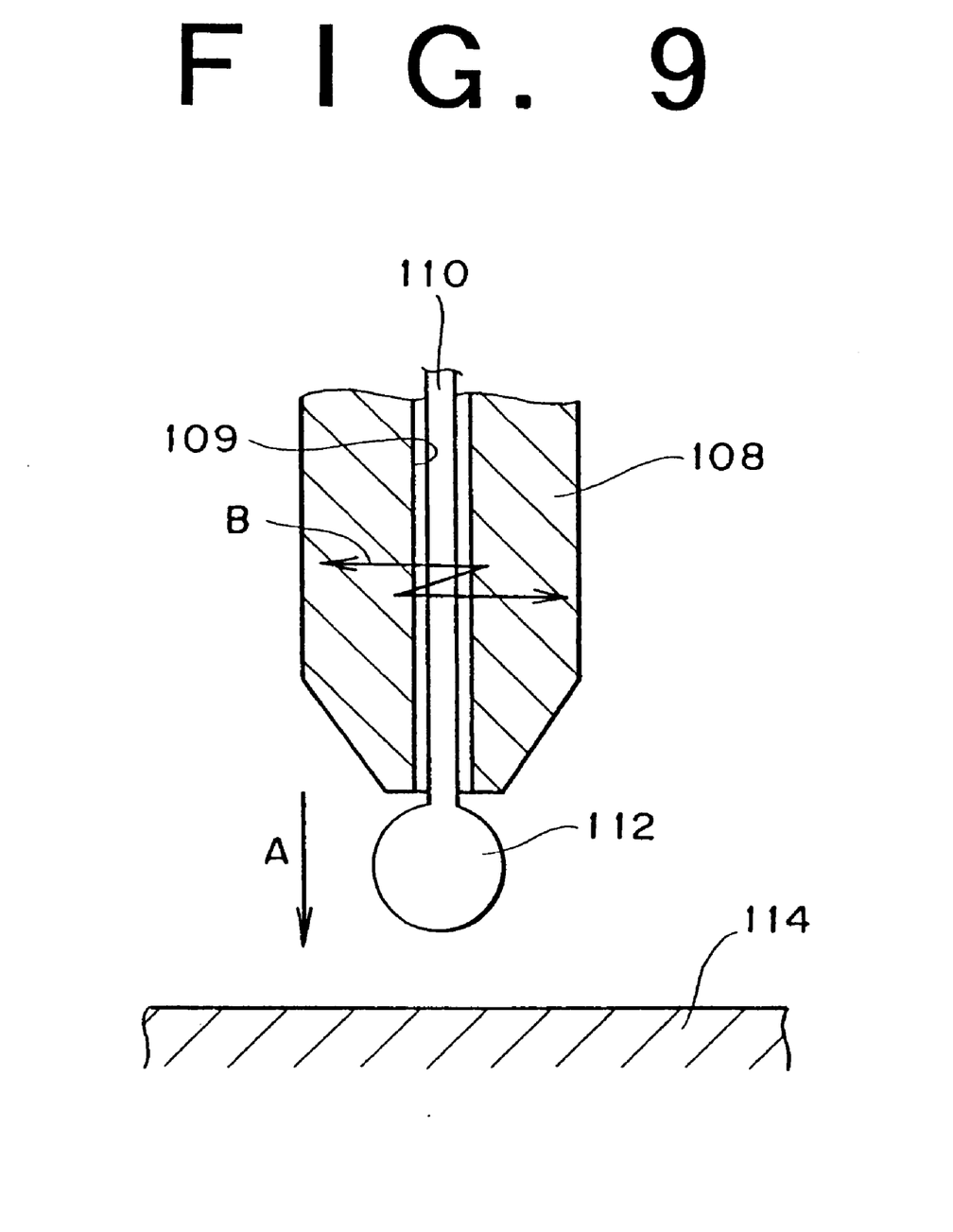
FIG. 9 is a sectional view showing the tip of a capillary of a bonding machine.

FIG. 9 is a sectional view showing the tip of a capillary 108 of the bonding machine. A gold wire 110 is inserted in a center hole 109 of the capillary 108, and a gold ball 112 is formed at the tip of the gold wire 110 by generating a spark between an electrode (not shown) and the capillary 108. The capillary 108 is moved in the direction of an arrow A to press a work 114 with a force of 80 to 100 gf. At the same time, high-frequency vibrations in the direction of an arrow B, i.e., in the lateral direction are applied to the capillary 108. The high-frequency vibrations cause diffusion jointing between the gold ball 112 and a gold coating formed on the surface of the work 114, thereby bonding the gold ball 112 to the work 114.

In the preferred embodiment shown in FIGS. 7 and 8, the high-frequency vibrations applied to the capillary 108 cause diffusion jointing between the gold ball 84 and the gold coatings of the lead lines 58 and 60, thereby bonding the gold ball 84 to the lead lines 58 and 60. For measurement of the electrical characteristics of the head assembly 35 in this preferred embodiment, the gold ball 84 bonded to the lead lines 58 and 60 must be removed, and after the measurement the gold ball 84 must be bonded again to the lead lines 58 and 60. For this reason, the bonding strength of the gold ball 84 to the lead lines 58 and 60 must be adjusted.

Figure 10:
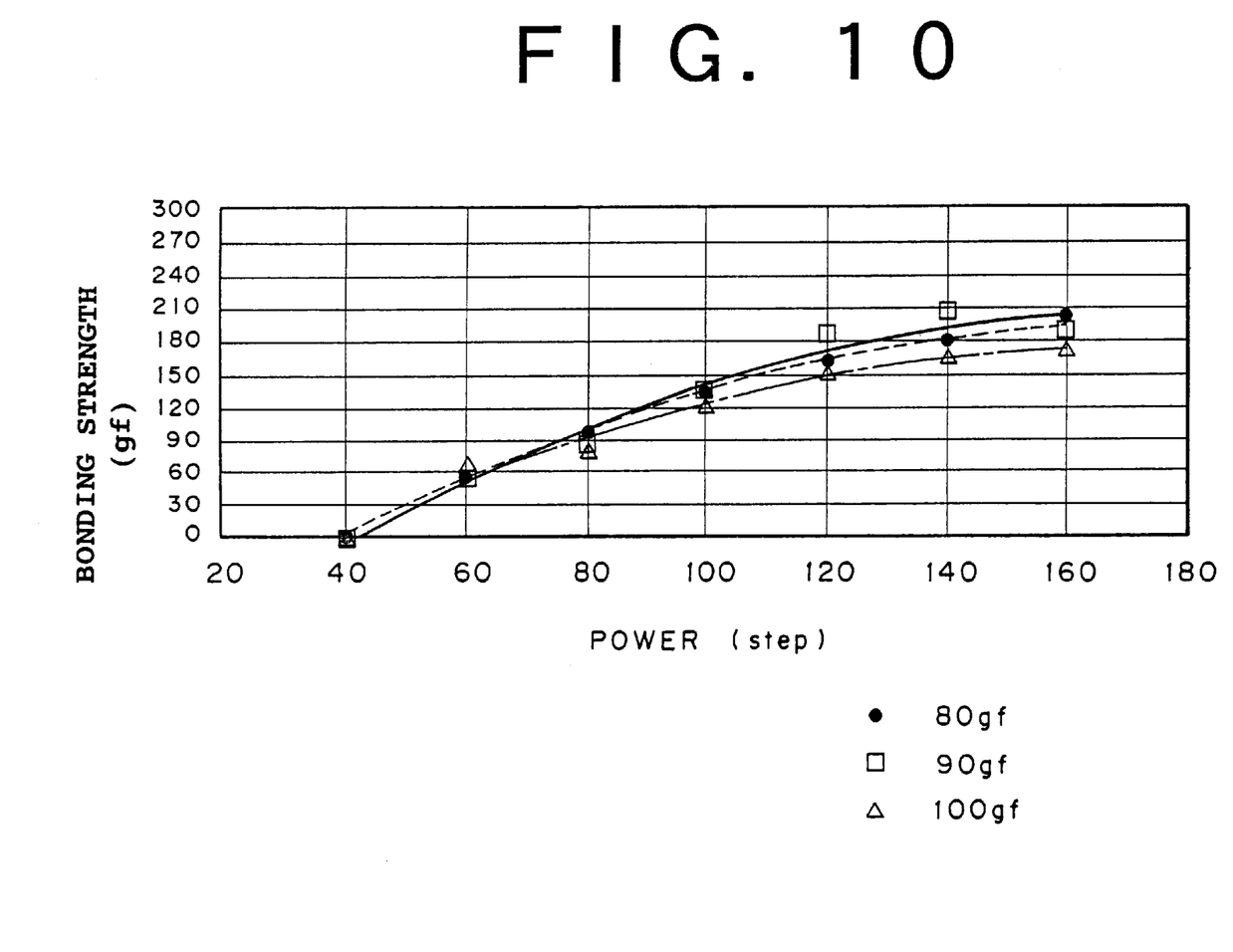
FIG. 10 is a graph showing the relation between bonding power and bonding strength.

Optimum values of the bonding strength will now be described with reference to a graph of FIG. 10. In FIG. 10, the horizontal axis represents scale on the dial of the bonding machine, in which an increase in scale on the dial indicates an increase in power. In other words, the power for laterally vibrating the capillary 108 is increased with an increase in scale on the dial. The vertical axis represents bonding strength (gf). In the case of usual bonding where a gold ball is semipermanently bonded to a work, a bonding strength of about 140 to 180 gf is required. In this preferred embodiment, however, the bonding strength is set preferably in the range of 60 to 100 gf because the gold ball 84 must be removed easily to some extent for the electrical characteristics test. FIG. 10 also shows variations in the bonding strength with changes in the pressing force of the capillary 108 against the work among 80 gf, 90 gf, and 100 gf.

A process of assembling the magnetic disk drive employing the head assembly 35 will now be described.

First, the gold ball 84 is bonded to the pair of lead lines 58 and 60 of the MR wiring pattern 56 formed on the suspension 34 to thereby short-circuit the lead lines 58 and 60. Then, the MR head 32a is attached by adhesion to the front end portion of the suspension 34. The terminals of the MR head 32a are electrically connected to the lead lines 58, 60, 64, and 66, thus assembling the head assembly 35. The electrical connection of the terminals of the MR head 32a and the lead lines 58, 60, 64, and 66 is effected also by bonding.

In the next step, the flying height of the head assembly 35 is measured. Then, the gold ball 84 is removed to electrically open the pair of lead lines 58 and 60, and thereafter the electrical characteristics of the head assembly 35 are measured. The removal of the gold ball 84 is accomplished by applying a mechanical force or by high-frequency washing in a washing liquid such as water. After finishing the measurement of the electrical characteristics of the head assembly 35, the gold ball 84 is bonded again to the pair of lead lines 58 and 60 to thereby short-circuit the lead lines 58 and 60.

Thereafter, the head assembly 35 is crimped to the front end portion of the actuator arm 30. Further, the interconnection FPC 50 is attached by adhesion to the side surface of the actuator arm 30 as shown in FIG. 3. Then, the terminals 52 of the interconnection FPC 50 are bonded to the terminals of the head assembly 35, and the terminals 54 of the interconnection FPC 50 are bonded to the terminals 43 of the main FPC 42. After this bonding, the gold ball 84 is removed to electrically open the lead lines 58 and 60. Finally, the magnetic disk drive including this head assembly 35 is assembled.

According to this preferred embodiment, in handling the head assembly 35 as a separate member, a current caused by static electricity or the like flows through the gold ball 84, and this current is prevented from flowing into the MR element 96, because the lead lines 58 and 60 connected to the MR element 96 are short-circuited by the gold ball 84. Accordingly, burning of the MR element 96 due to the current caused by static electricity can be prevented.

Figure 11:
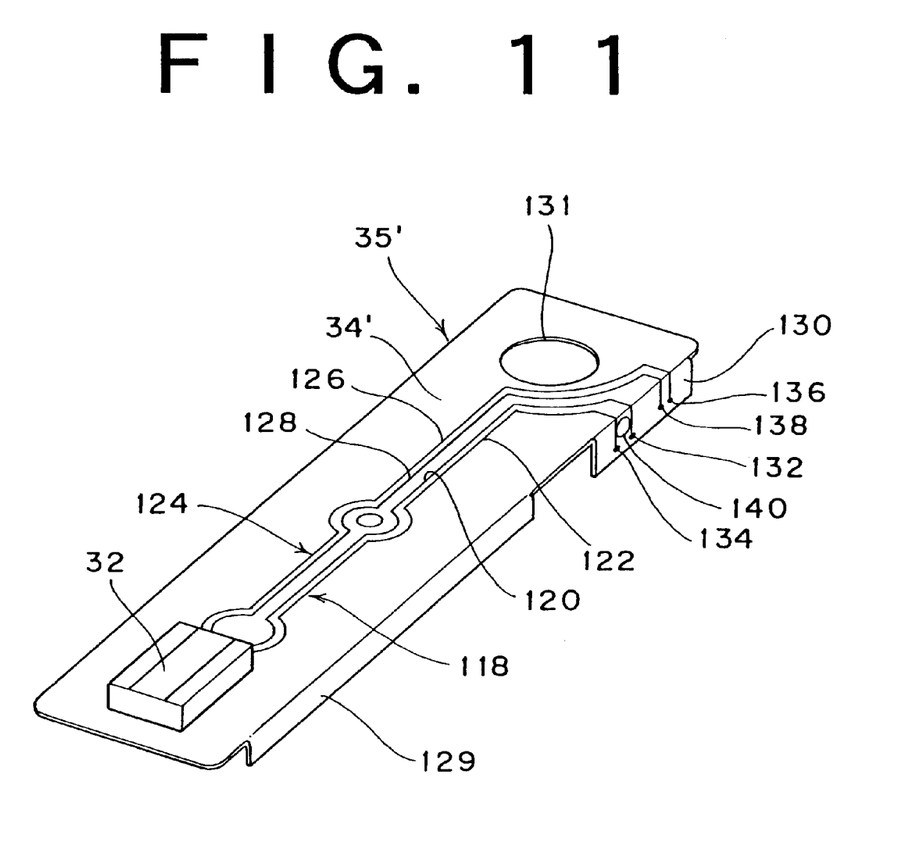
FIG. 11 is a perspective view of a head assembly according to a second preferred embodiment of the present invention.

Referring to FIG. 11, there is shown a perspective view of a head assembly 35' according to a second preferred embodiment of the present invention. In this preferred embodiment, an MR wiring pattern 118 consisting of a pair of lead lines 120 and 122 and a coil wiring pattern 124 consisting of a pair of lead lines 126 and 128 are formed on a suspension 34'. A tab 130 is suspended from one side edge of the suspension 34' at its base end portion. The lead lines 120, 122, 126, and 128 extend to the tab 130 and are respectively connected to terminals 132, 134, 136, and 138 formed on the tab 130.

The lead lines 120 and 122 of the MR wiring pattern 118 are short-circuited by a gold ball 140 formed by bonding on the tab 130. Reference numeral 129 denotes a rib, and 131 denotes a crimping hole. According to this preferred embodiment, the short-circuiting gold ball 140 is formed on the tab 130, so that the removal and bonding of the gold ball 140 can be relatively easily carried out in an actuator having a plurality of head assemblies.

Figure 12:
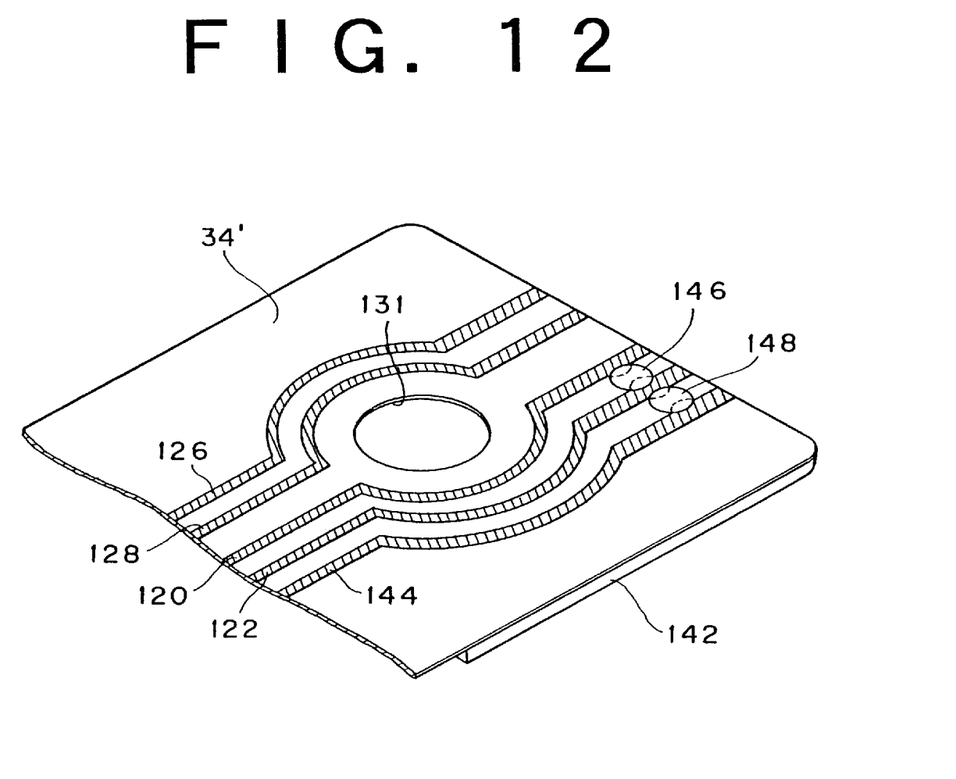
FIG. 12 is an enlarged view of an essential part of a head assembly according to a third preferred embodiment of the present invention.

Referring to FIG. 12, there is shown an enlarged view of an essential part of a head assembly according to a third preferred embodiment of the present invention. In this preferred embodiment, a ground line 144 for grounding the first and second magnetic shields 90 and 92 (see FIG. 6) is additionally formed on the suspension 34'. Like the second preferred embodiment, lead lines 120, 122, 126, and 128 are formed on the suspension 34'. The lead lines 120 and 122 are connected by bonding through a gold ball 146, and the lead line 122 and the ground line 144 are connected by bonding through a gold ball 148.

According to this preferred embodiment, the lead lines 120 and 122 are short-circuited by the gold ball 146, and the lead line 122 and the ground line 144 are also short-circuited by the gold ball 148. Accordingly, a current caused by static electricity or the like flows through the gold balls 146 and 148. As a result, the current is prevented from flowing into the MR element 96 and also prevented from being discharged between the MR element 96 and the magnetic shields 90 and 92, thereby preventing burning of the MR element 96.

As a modification of this preferred embodiment, the ground line 144 may be formed between the lead lines 120 and 122. In this case, the lead line 120 and the ground line 144 are connected by bonding through the gold ball 146, and the lead line 122 and the ground line 144 are connected by bonding through the gold ball 148. Reference numeral 142 denotes a spacer fixed to the suspension 34'. While each preferred embodiment described above is intended to prevent burning of the MR element, the present invention is not limited to the above preferred embodiments, but is applicable also to any other head elements susceptible to static electricity.

According to the present invention as described above, in handling the head assembly as a separate member, the terminals of the MR element and/or the MR element and the magnetic shields are short-circuited. Accordingly, even when an excess current due to static electricity applied between the terminals of the MR element, this current flows through the metal ball bonded to the terminals, thereby preventing the excess current due to static charge from flowing into the MR element. Further, since the MR element and the magnetic shields are short-circuited to be at almost the same potential, discharge of static electricity between the MR element and the magnetic shields can be prevented. As a result, burning of the MR element due to static electricity can be prevented.

What is claimed is:

1. A head assembly comprising:
   a suspension;
   a head slider mounted on a front end portion of said suspension and having a head element;
   a pair of lead lines formed on said suspension and having first ends connected to said head element;
   a conductive metal ball bonded to said pair of lead lines by diffusion jointing between said conductive metal ball and each said lead line while applying high-frequency vibrations to said conductive metal ball.

2. A head assembly according to claim 1, wherein said conductive metal ball comprises a gold ball.

3. A head assembly according to claim 1, further comprising a tab suspended from one side edge of said suspension;
   wherein said pair of lead lines extend to said tab, and said conductive metal ball is provided on said tab.

4. A head assembly according to claim 1, wherein said head element comprises a magnetoresistive element.

5. A head assembly according to claim 1, wherein said head slider has a magnetic shield for said head element; and said head assembly further comprises:
   a ground line formed on said suspension and having one end connected to said magnetic shield; and
   a second conductive metal ball electrically shorting said lead lines to said ground line.

6. A head assembly according to claim 1, wherein each of said lead lines has a gold coating.

7. A head assembly comprising:
   a suspension;
   a head slider mounted on a front end portion of said suspension and having a head element;
   a pair of lead lines formed on said suspension and having first ends connected to terminals of said head element by bonding through first conductive metal balls; and
   a second conductive metal ball connected by bonding to said pair of lead lines by diffusion jointing between said second conductive metal ball and each said lead line while applying high-frequency vibrations to said conductive metal ball.

8. A head assembly according to claim 7, wherein each of said first conductive first metal balls and said second conductive metal ball comprises a gold ball.

9. A head assembly according to claim 7, wherein each of said lead lines has a gold coating.

10. A suspension for supporting a head slider having a head element, comprising;
    a pair of lead lines formed on said suspension and having first ends to be connected to said head element;
    a conductive metal ball shorting said pair of lead lines, said conductive metal ball being bonded to said pair of lead lines by diffusion jointing while applying high-frequency vibrations to said conductive metal ball.

11. A suspension according to claim 10, wherein said conductive metal ball comprises a gold ball.

12. A suspension according to claim 10, wherein said head element comprises a magnetoresistive element.

13. A suspension according to claim 10, further comprising a tab suspended from one side edge of said suspension;
    wherein said pair of lead lines extend to said tab, and said metal ball is provided on said tab.

14. A suspension according to claim 10, wherein each of said lead lines has a gold coating.

* * * * *